United States Patent
Iwai et al.

(10) Patent No.: US 9,030,168 B2
(45) Date of Patent: May 12, 2015

(54) POWER CONVERSION DEVICE, POWER GENERATION SYSTEM AND CHARGE AND DISCHARGE CONTROL METHOD

(75) Inventors: Ryo Iwai, Osaka (JP); Yukihiro Shimizu, Osaka (JP); Shunsuke Nishi, Osaka (JP); Masaki Eguchi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 400 days.

(21) Appl. No.: 13/505,780

(22) PCT Filed: Nov. 24, 2010

(86) PCT No.: PCT/JP2010/070924
§ 371 (c)(1),
(2), (4) Date: May 3, 2012

(87) PCT Pub. No.: WO2011/065375
PCT Pub. Date: Jun. 3, 2011

(65) Prior Publication Data
US 2012/0223679 A1 Sep. 6, 2012

(30) Foreign Application Priority Data

Nov. 25, 2009 (JP) .................................. 2009-267482

(51) Int. Cl.
*H02J 7/00* (2006.01)
*H01M 10/46* (2006.01)
(Continued)

(52) U.S. Cl.
CPC .............. *H01M 10/465* (2013.01); *H02J 3/383* (2013.01); *Y02B 10/14* (2013.01); *Y02E 10/563* (2013.01); *H02J 1/12* (2013.01); *H02J 7/35* (2013.01); *Y02E 10/566* (2013.01)

(58) Field of Classification Search
CPC .......... H01M 10/0525; H01M 2/1653; H01M 4/131; H01M 10/46; H01M 2/1673; Y02E 60/122; Y02E 60/12; B60L 11/005; B60L 11/14
USPC ................... 320/109, 107, 134, 118, 137, 116
See application file for complete search history.

(56) References Cited

U.S. PATENT DOCUMENTS 6,949,843 B2 * 9/2005 Dubovsky ........................ 307/64
7,394,237 B2 * 7/2008 Chou et al. ..................... 323/299
(Continued)

FOREIGN PATENT DOCUMENTS

CN 101345500 A 1/2009
CN 201349185 Y 11/2009
(Continued)

OTHER PUBLICATIONS

International Search Report for PCT/JP2010/070924, mailed Mar. 1, 2011.

*Primary Examiner* — Brian Ngo
(74) *Attorney, Agent, or Firm* — Nixon & Vanderhye, P.C.

(57) ABSTRACT

A power conversion device includes: a DC/DC convertor (5) that performs DC/DC conversion on an output voltage of a direct-current power supply (for example, a solar battery module (1)); and a DC/AC invertor (6) that performs DC/AC conversion on an output voltage of the DC/DC convertor (5). The output power of the DC/AC invertor (6) is controlled such that the charge and discharge of a storage device (for example, a storage battery (3)) connected to a connection point between an output end of the DC/DC convertor (5) and an input end of the DC/AC invertor (6) are controlled.

6 Claims, 9 Drawing Sheets

(51) Int. Cl.
*H02J 3/38* (2006.01)
*H02J 1/12* (2006.01)
*H02J 7/35* (2006.01)

(56) References Cited

U.S. PATENT DOCUMENTS

| | | | |
|---|---|---|---|
| 2003/0047209 A1 | 3/2003 | Yanai et al. | |
| 2007/0108946 A1* | 5/2007 | Yamauchi et al. | 320/132 |
| 2008/0272653 A1* | 11/2008 | Inoue et al. | 307/47 |
| 2008/0290838 A1* | 11/2008 | Llonch | 320/137 |
| 2009/0236916 A1 | 9/2009 | Nishimura | |

FOREIGN PATENT DOCUMENTS

| | | |
|---|---|---|
| JP | 06-266454 | 9/1994 |
| JP | 7-38130 | 2/1995 |
| JP | 11-127546 | 5/1999 |
| JP | 11-299295 | 10/1999 |
| JP | 2001-197751 | 7/2001 |
| JP | 2003-79054 | 3/2003 |
| JP | 2003-102104 | 4/2003 |
| JP | 2006-288002 | 10/2006 |
| JP | 2008-054473 | 3/2008 |

* cited by examiner

POWER CONVERSION DEVICE, POWER GENERATION SYSTEM AND CHARGE AND DISCHARGE CONTROL METHOD

This application is the U.S. national phase of International Application No. PCT/JP2010/070924, filed 24 Nov. 2010, which designated the U.S. and claims priority to Japan Application No. 2009-267482, filed 25 Nov. 2009, the entire contents of each of which are hereby incorporated by reference.

TECHNICAL FIELD

The present invention relates to a power conversion device, a power generation system and a charge and discharge control method.

BACKGROUND ART

Since solar batteries do not have a power storage function, various power generation systems incorporating a solar battery and a storage battery together have been conventionally proposed.

For example, patent document 1 discloses an alternating-current end commercial switching (without a system linkage) solar battery power supply system in which a storage battery is connected through a charge and discharge control circuit to a connection point between a solar battery and an invertor.

For example, patent document 2 discloses a solar power generation system in which a storage battery is connected through a charge and discharge controller to a connection point between a solar battery and a system linkage invertor having a self-operation function. In the solar power generation system disclosed in patent document 2, auxiliary charge for the storage battery is performed using power on the side of the commercial power system.

For example, patent document 3 discloses a solar power generation system in which power generated by a solar battery device is fed through a current control portion or a charge and discharge control portion to a storage battery portion or an invertor device, and which switches the following three methods: a control circuit controls the current control portion or the charge and discharge control portion and the storage battery portion, and thus the power generated by the solar battery device is used only for charging the storage battery portion; the power generated by the solar battery device is used only for being fed to the invertor device; and both the power generated by the solar battery device and the power of the storage battery are fed to the invertor device. Furthermore, in the solar power generation system disclosed in patent document 3, the storage battery is charged by the power from the solar battery or the power from the power system.

RELATED ART DOCUMENT

Patent Document

Patent document 1: JP-A-H7-38130 (abstract)
Patent document 2: JP-A-H11-127546 (FIGS. 1 and 2, paragraphs [0005] and [0019])
Patent document 3: JP-A-2003-79054 (FIGS. 1, 3, 4 to 5 and 11, paragraphs [0031], [0032] and [0070])

DISCLOSURE OF THE INVENTION

Problems to be Solved by the Invention

The solar battery power supply system disclosed in patent document 1 is intended to be applied to a system in which power generated by the solar battery during the daytime is temporarily stored in the storage battery, and the power stored in the storage battery is fed to a load during the night time. The system described above is simply a system which controls the charge and discharge of the storage battery such that the depth of discharge of the storage battery is prevented from being so increased as to adversely affect the life.

Hence, patent document 1 does not disclose at all the control in which, in a system capable of supplying power to a load under normal conditions, power generated by a direct-current power supply such as a solar battery is effectively utilized for power supply to the load.

The section "Conventional Art" of patent document 1 discloses that a DC/DC converter is used; for example, if the charge and discharge control circuit shown in FIG. 1 has the DC/DC converter, a power loss is disadvantageously produced in the DC/DC converter of the charge and discharge control circuit, with the result that the efficiency of utilization of the power is reduced.

The solar power generation system disclosed in patent document 2 is intended to be applied to a system that is used as a power supply source when a commercial power system does not supply power in a disaster such as an earthquake. It is suggested that, in the system described above, the storage battery can be charged not only by the solar battery but also by the commercial power system without a charger.

Hence, patent document 2 does not disclose at all the control in which, in a system capable of supplying power to a load under normal conditions, power generated by a direct-current power supply such as a solar battery is effectively utilized for power supply to the load.

Furthermore, in the solar power generation system disclosed in patent document 2, since auxiliary charge for the storage battery is performed using power on the side of the commercial power system, in the purchasing system of a power company where power provided by the commercial power system is not purchased, a problem can occur in which it is impossible to distinguish whether the power stored in the storage battery is supplied by the power generation of the direct-current power supply such as a solar battery or by the commercial power system.

Patent document 3 does not specifically disclose what type of operation is performed to switch the three methods described above in the current control portion or the charge and discharge control portion. It is likely that, in the solar power generation system disclosed in patent document 3, the power generated by the solar battery device cannot be simultaneously fed to both the storage battery portion and the invertor device, and that the power generated by the solar battery device cannot be effectively utilized for power supply to a load.

Furthermore, in the solar power generation system disclosed in patent document 3, since charge for the storage battery may be performed using power from the commercial power system, in the purchasing system of a power company where power provided by the commercial power system is not purchased, a problem can occur in which it is impossible to distinguish whether the power stored in the storage battery is supplied by the power generation of the direct-current power supply such as a solar battery or by the commercial power system.

In view of the foregoing conditions, the present invention has an object to provide a power conversion device, a power generation system and a charge and discharge control method in which power generated by a direct-current power supply can be effectively utilized.

Means for Solving the Problem

To achieve the above object, according to the present invention, there is provided a power conversion device including: a DC/DC convertor that performs DC/DC conversion on an output voltage of a direct-current power supply; and a DC/AC invertor that performs DC/AC conversion on an output voltage of the DC/DC convertor, in which an output power of the DC/AC invertor is controlled such that charge and discharge of a storage device connected to a connection point between an output end of the DC/DC convertor and an input end of the DC/AC invertor are controlled.

When the storage device is charged, the control is performed such that the output power of the DC/AC invertor is lower than an output power of the DC/DC convertor, and when discharge is performed from the storage device, the control is performed such that the output power of the DC/AC invertor is higher than the output power of the DC/DC convertor.

An output end of the DC/AC invertor is connected to a load and a commercial system, and power supply to the load is preferentially performed in the following order: a power generated by the direct-current power supply, a power stored in the storage device and a power of the commercial system. In this case, for example, the following can be probably performed. When the load is being used, if the consumption power of the load is covered only by the direct-current power supply, the power generated by the direct-current power supply is used in the load, if the consumption power of the load is not covered only by the power generated by the direct-current power supply, the power stored in the storage device is used in the load or if the consumption power of the load is not covered only by the power generated by the direct-current power supply and the power stored in the storage device, the power of the commercial system is used in the load.

When a power discharged from the storage device drops below a lower limit of an allowable range, the output power of the DC/AC invertor is reduced, and, even if the load is being used, the power of the commercial system is preferentially used in the load as compared with the power generated by the direct-current power supply.

To achieve the above object, according to the present invention, there is provided a power generation system including: the power conversion device of any one of the configurations described above; the direct-current power supply that is connected to the DC/DC convertor of the power conversion device; the storage device that is connected to the connection point between the output end of the DC/DC convertor and the input end of the DC/AC invertor of the power conversion device; and the load that is connected to the output end of the DC/AC invertor, in which the output end of the DC/AC invertor is connected to the commercial system.

To achieve the above object, according to the present invention, there is provided a power generation system including: the power conversion device of any one of the configurations described above; the direct-current power supply that is connected to the DC/DC convertor of the power conversion device; the storage device that is connected to the connection point between the output end of the DC/DC convertor and the input end of the DC/AC invertor of the power conversion device; and the load that inputs a direct-current power output from the storage device, in which the output end of the DC/AC invertor is connected to the commercial system.

In the power generation system of any one of the configurations described above, for example, the direct-current power supply is a solar battery, the load is a charge stand that charges a charge target and the DC/DC convertor controls an operation point of the solar battery by maximum power point follow control.

To achieve the above object, according to the present invention, there is provided a method of controlling charge and discharge of a storage device, a power conversion device including a DC/DC convertor that performs DC/DC conversion on an output voltage of a direct-current power supply and a DC/AC invertor that performs DC/AC conversion on an output voltage of the DC/DC convertor, the storage device being connected to a connection point between an output end of the DC/DC convertor of and an input end of the DC/AC invertor of the power conversion device, in which an output power of the DC/AC invertor is controlled such that the charge and the discharge of the storage device are controlled.

Advantages of the Invention

Since, according to the present invention, the DC/DC convertor is provided between the direct-current power supply and the DC/AC invertor and the storage device, the output power of the direct-current power supply can be controlled by the DC/DC convertor. Thus, it is possible to bring the power generated by the direct-current power supply into a state suitable for the charge of the storage device. Then, since the output power of the DC/AC invertor is controlled, and thus the charge and discharge of the storage device is controlled, the power generated by the direct-current power supply and controlled by the DC/DC convertor can be switched between the following four states: the state where the power is supplied to the DC/AC invertor and the storage device; the state where the power together with the power stored in the storage device is supplied to the DC/AC invertor; the state where the power is not supplied to the storage device and is supplied to the DC/AC invertor; the state where the power is not supplied to the DC/AC invertor and is supplied to the storage device. Hence, it is possible to effectively utilize the power generated by the direct-current power supply. Therefore, when the application to the power generation system capable of constantly supplying power to the load is performed, it is possible to achieve the system that can effectively utilize the power generated by the direct-current power supply.

Since, according to the present invention, the storage device is connected to the connection point between the output end of the DC/DC convertor and the input end of the DC/AC invertor, a problem is not encountered in which, at the time of charge and discharge, a loss of power charged and discharged into and from the storage device in the DC/DC convertor is produced. Hence, it is possible to achieve high power conversion efficiency.

According to the present invention, in the configuration in which the power supply to the load is performed in the following order of priority: the power generated by the direct-current power supply, the power stored in the storage device and the power of the commercial system, the power generated by the direct-current power supply is preferentially used for the power supply to the load, and thus it is possible to more effectively utilize the power generated by the direct-current power supply.

According to the present invention, in the configuration in which the commercial system is connected, the power from the commercial system is not stored in the storage device, and the power generated by the direct-current power supply such as a solar battery is stored in the storage device. In this way, even in the purchasing system of a power company where power provided by the commercial system is not purchased, the problem does not occur that results from the fact that it is impossible to distinguish whether the power stored in the storage device is supplied by the power generation of the direct-current power supply or by the commercial system.

DESCRIPTION OF EMBODIMENTS

An embodiment of the present invention will be described below with reference to drawings. Here, as an example of the power generation system of the present invention, a solar power generation system will be described.

Figure 1:
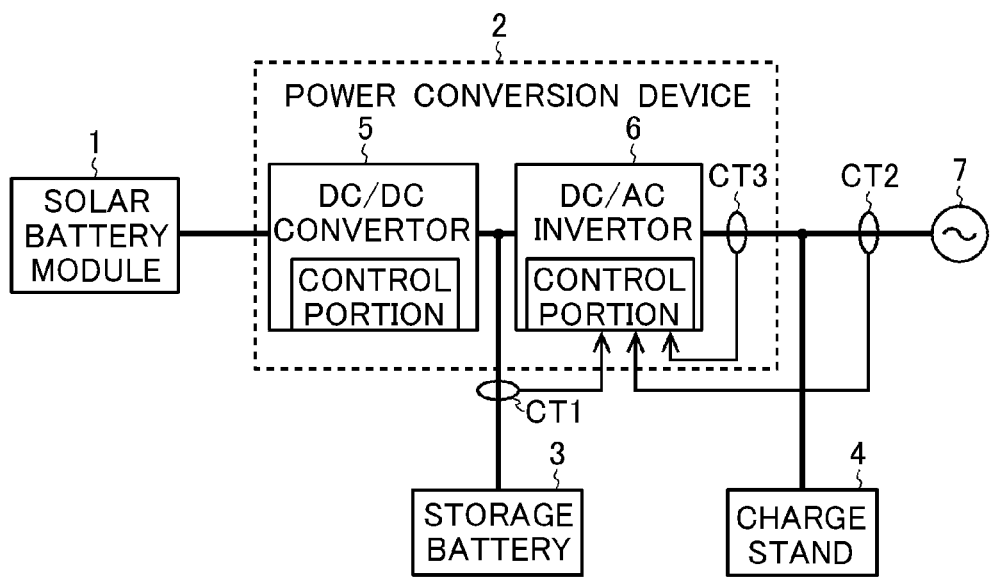
[FIG. 1] A diagram showing an example of the schematic configuration of a solar power generation system according to the present invention.
Figure 2:
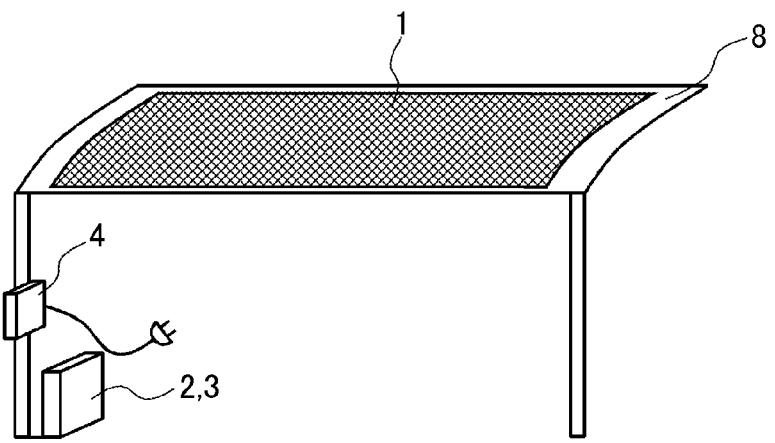
[FIG. 2] A diagram showing an example of the appearance of the solar power generation system shown in FIG. 1 and according to the present invention.

An example of the schematic configuration of the solar power generation system according to the present invention is shown in FIG. 1. The solar power generation system shown in FIG. 1 and according to the present invention includes, a solar battery module 1, a power conversion device 2, a storage battery 3, a charge stand 4 with which plug-in charge for a hybrid automobile and an electric automobile can be performed and current sensors CT1 and CT2 that can detect the direction and magnitude of current. The solar power generation system is linked to a commercial system 7. The power conversion device 2 includes a DC/DC convertor 5, a DC/AC invertor 6 and a current sensor CT3 that can detect the direction and magnitude of current. An emergency AC outlet that allows the output power of the DC/AC invertor 6 to be utilized as emergency power when the commercial system 7 has a fault such as a power failure may be provided in the power conversion device 2. The appearance of the solar power generation system shown in FIG. 1 and according to the present invention is shown in FIG. 2. In an example shown in FIG. 2, the solar battery module 1 is provided on the roof 8 of a carport.

The DC/DC convertor 5 performs so-called MPPT control (maximum power point follow control) in which the operation point of the solar battery module 1 is controlled such that the output power of the solar battery module 1 is maximized. The DC/DC convertor 5 is operated such that the output voltage of the DC/DC convertor 5 does not exceed 420 volts. As will be described later, 420 volts is an upper limit value in the specifications of the storage battery 3. In other words, the DC/DC convertor 5 has the function of limitation to a voltage suitable for charging the storage battery 3.

The storage battery 3 is connected to a connection point between the output end of the DC/DC convertor 5 and the input end of the DC/AC invertor 6. Since, as described above, the storage battery 3 is connected to the connection point between the output end of the DC/DC convertor 5 and the input end of the DC/AC invertor 6 without the intervention of a charge and discharge DC/DC convertor, a problem is not encountered in which, at the time of charge and discharge, a power loss is produced in the charge and discharge DC/DC convertor. Hence, the solar power generation system shown in FIG. 1 and according to the present invention can achieve high power conversion efficiency.

In the specifications of the storage battery 3, the operation range from 330 volts to 420 volts is specified. The reason why the operation range of the storage battery 3 is set at 330 volts or more here is that, since the storage battery 3 is connected to the connection point between the output end of the DC/DC convertor 5 and the input end of the DC/AC invertor 6, a connection point voltage (hereinafter referred to as a connection point voltage V link) between the output end of the DC/DC convertor 5 and the input end of the DC/AC invertor 6 is equal to the voltage of the storage battery 3, and that, if the connection point voltage V link is not higher than the voltage peak value (for example, about 286 volts when the root-mean-square value is 202 volts) of the commercial system 7, the DC/AC invertor 6 cannot be linked to the system. Since the voltage (330 volts or more) of the storage battery 3 is higher than that of the commercial system 7, the commercial system 7 is prevented from charging the storage battery 3.

The output end of the DC/AC invertor 6 is connected to the charge stand 4 and the commercial system 7.

A control portion (for example, either or both of a DSP (digital signal processor) and a microcomputer) within the DC/AC invertor 6 receives a detection signal output from the current sensor CT1 for detecting the charge current and discharge current of the storage battery 3, and monitors, with the detection signal, the charge and discharge state of the storage battery 3.

The control portion within the DC/AC invertor 6 also receives detection signals output from the current sensors CT2 and CT3, and determines, from a difference between the detection signals, whether or not the charge stand 4 is being used. The current sensors CT2 and CT3 are provided in such positions that whether or not the charge stand 4 is being used can be determined from the difference between the detection signals of the current sensors CT2 and CT3. Specifically, the current sensor CT2 is provided in such a position that, as seem from the side of the solar battery module 1, the current sensor CT2 is directly behind the charge stand 4 and that no other load is present between the charge stand 4 and the current sensor CT2; the current sensor CT3 is provided in such a position that, as seem from the side of the solar battery module 1, the current sensor CT3 is directly in front of the charge stand 4 and that no other load is present between the current sensor CT3 and the charge stand 4.

Figure 3:
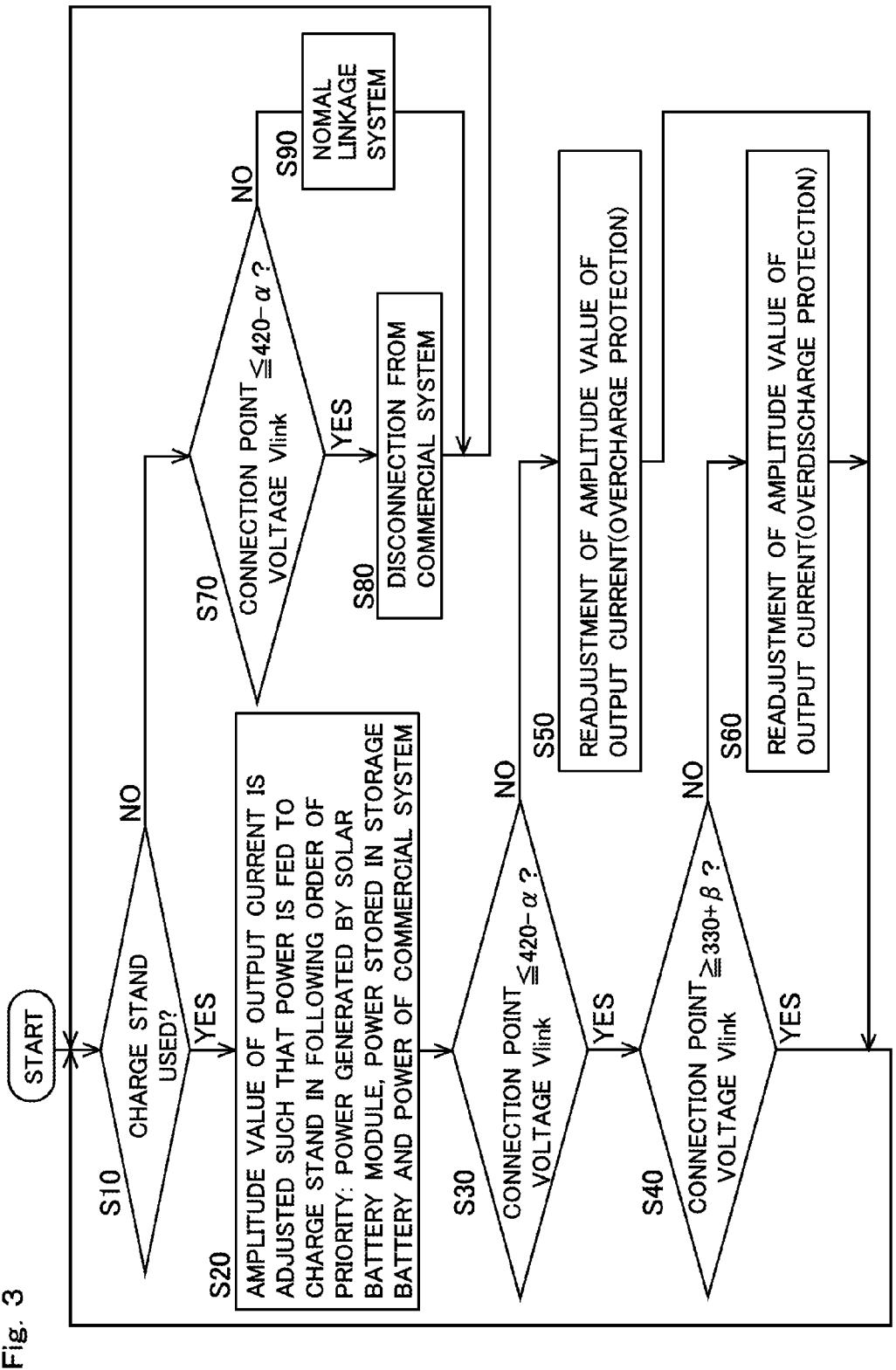
[FIG. 3] A flowchart showing the control operation of a DC/AC invertor.

The DC/AC invertor 6 controls the output power, and thereby performs the charge and discharge control on the storage battery 3 and the power supply control on the charge stand 4. Here, when the storage battery 3 is charged, the control is performed such that the output power of the DC/AC invertor 6 is lower than that of the DC/DC convertor 5 whereas, when discharge from the storage battery 3 is performed, the control is performed such that the output power of the DC/AC invertor 5 is higher than that of the DC/DC convertor 5. More specifically, since the solar power generation system shown in FIG. 1 and according to the present invention is linked to the commercial system 7 and thus the voltage of the commercial system 7 remains constant, the DC/AC invertor 6 adjusts the amplitude value of the output current to control the output power. The control operation of the DC/AC invertor 6 will be described with reference to the flowchart shown in FIG. 3.

When the DC/AC invertor 6 starts the operation, it first determines whether or not the charge stand 4 is being used (step S10). More specifically, as described above, the control portion of the DC/AC invertor 6 receives the detection signals output from the current sensors CT2 and CT3, and determines, from the difference between the detection signals, whether or not the charge stand 4 is being used (when the difference between the detection signal output from the current sensor CT2 and the detection signal output from the current sensor CT3 is zero, the control portion determines that the charge stand 4 is not being used).

If the charge stand 4 is being used (yes in step S10), the DC/AC invertor 6 adjusts the amplitude value of the output current such that power is fed to the charge stand 4 in the following order of priority: the power generated by the solar battery module 1, the power stored in the storage battery 3 and the power of the commercial system 7 (step S20).

If the power generated by the solar battery module 1 is higher than the consumption power of the charge stand 4, the DC/AC invertor 6 adjusts the amplitude value of the output current such that the output power of the DC/AC invertor 6 is equal to the consumption power of the charge stand 4. Thus, as shown in FIG. 4, the surplus power of the solar battery module 1 is stored in the storage battery 3, and the connection point voltage V link is gradually increased.

Figure 4:
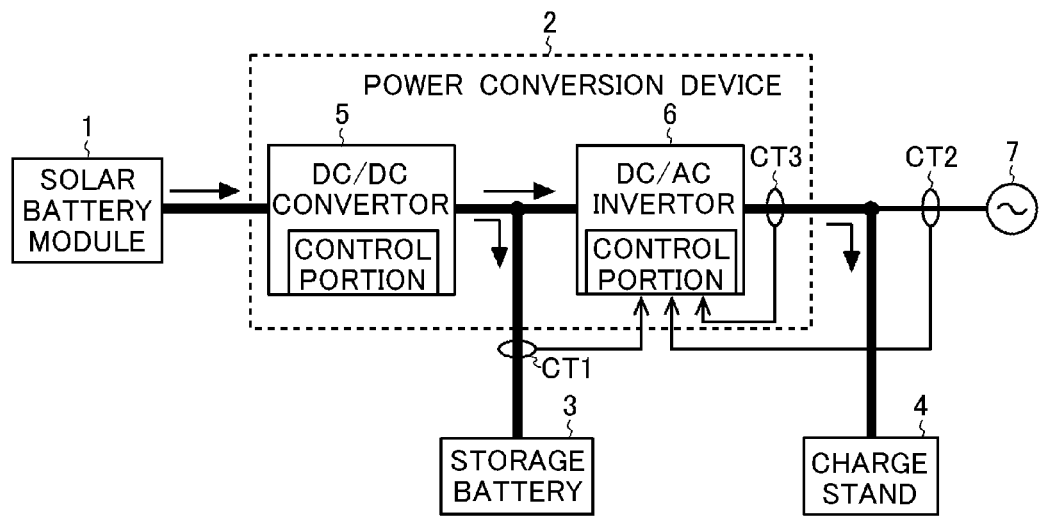
[FIG. 4] A diagram showing a state of power supply when power generated by a solar battery module is higher than consumption power of a charge stand while the charge stand is being used.

Since, in FIG. 4, the output of the DC/DC convertor 5, the input of the DC/AC invertor 6 and the storage battery 3 are connected without the intervention of an element such as a resistor, the potentials thereof are practically equal to each other. However, the fact that the storage battery can be charged by controlling the output current of the DC/AC invertor 6 will be described using a view that, in an extremely short period of time, the potentials differ at the three points mentioned above. In actuality, elements such as a resistor and a coil may be present between the three points and the connection point, and a filter circuit or the like may be connected.

If the power generated by the solar battery module 1 is higher than the consumption power of the charge stand 4, when the control is performed such that the amplitude of the output current of the DC/AC invertor 6 is decreased, the power generated by the solar battery module 1 causes the output voltage of the DC/DC convertor 5 to be increased beyond the voltage before the amplitude of the output current of the DC/AC invertor 6 was controlled. Hence, the voltage of the DC/DC convertor 5 becomes higher than that of the storage battery 3, and thus the output power of the DC/DC convertor 5 is stored in the storage battery 3. In this way, the voltage of the storage battery 3 is increased to become equal to that of the output of the DC/DC convertor 5. Likewise, as the voltage of the DC/DC convertor 5 is increased, the voltage of the input of the DC/AC invertor 6 is increased to become equal to that of the output of the DC/DC convertor 5.

Figure 5:
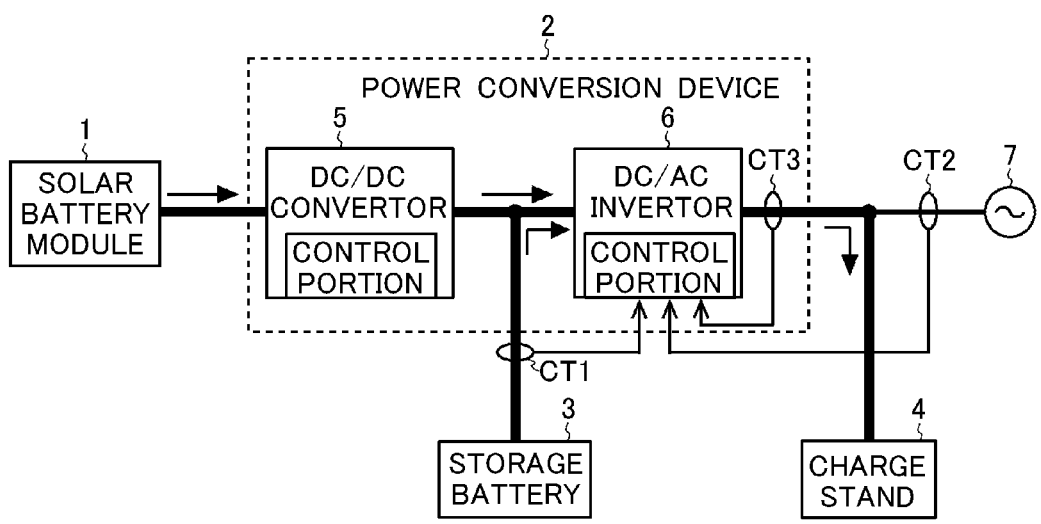
[FIG. 5] A diagram showing a state of power supply when the power generated by the solar battery module is not higher than the consumption power of the charge stand and a current discharged by a storage battery does not reach an upper limit while the charge stand is being used.
Figure 6:
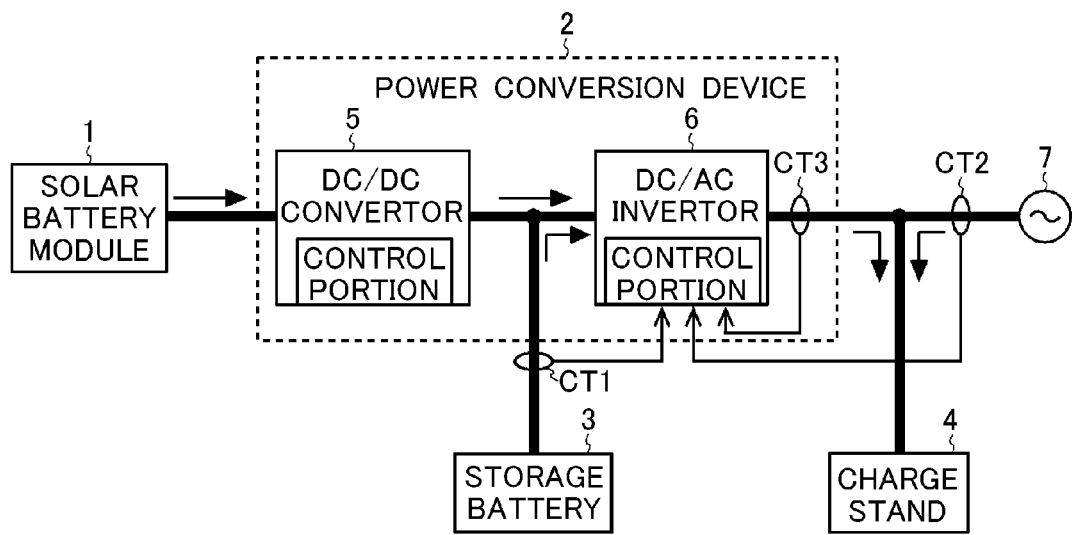
[FIG. 6] A diagram showing a state of power supply when the power generated by the solar battery module is not higher than the consumption power of the charge stand and the current discharged by the storage battery reaches the upper limit while the charge stand is being used.

If the power generated by the solar battery module 1 is not higher than the consumption power of the charge stand 4, the DC/AC invertor 6 adjusts the amplitude value of the output current such that the output power of the DC/AC invertor 6 is equal to the consumption power of the charge stand 4. Thus, as shown in FIG. 5, the power generated by the solar battery module 1 and the power discharged by the storage battery 3 are converted by the DC/AC invertor 6 into alternating-current power, and is fed to the charge stand 4, with the result that the connection point voltage V link is gradually decreased. However, even when the power discharged by the storage battery reaches the upper limit value, if the output power of the DC/AC invertor 6 is lower than the consumption power of the charge stand 4, the power is limited such that the amplitude value of the output current of the DC/AC invertor 6 is prevented from being increased any more. In this case, since the consumption power of the charge stand 4 cannot be covered only by the output power of the DC/AC invertor 6, as shown in FIG. 6, power equivalent to the power shortage is supplied from the commercial system 7 to the charge stand 4.

Since, in FIG. 5, the output of the DC/DC convertor 5, the input of the DC/AC invertor 6 and the storage battery 3 are connected without the intervention of an element such as a resistor, the potentials thereof are practically equal to each other. However, the fact that the storage battery can be charged by controlling the output current of the DC/AC invertor 6 will be described using a view that, in an extremely short period of time, the potentials differ at the three points mentioned above. In actuality, elements such as a resistor and a coil may be present between the three points and the connection point, and a filter circuit or the like may be connected.

If the power generated by the solar battery module 1 is lower than the consumption power of the charge stand 4, when the control is performed such that the amplitude of the output current of the DC/AC invertor 6 is increased, the power generated by the solar battery module 1 becomes insufficient, and the output voltage of the DC/DC convertor 5 becomes lower than the voltage before the amplitude of the output current of the DC/AC invertor 6 was controlled. Since the DC/AC invertor 6 uses power to supply it to the load 4, the voltage of the input of the DC/AC invertor 6 becomes lower than the voltage before the amplitude of the output current of the DC/AC invertor 6 was controlled. Hence, the voltage of the storage battery 3 becomes higher than the voltage of the DC/DC convertor 5 and the voltage of the input of the DC/AC invertor 6, discharge from the storage battery 3 is performed and power equivalent to the shortage of power of the direct-current power supply 1 with respect to the consumption power of the load is supplied to the DC/AC invertor. In this way, the voltage of the storage battery 3 is decreased to become equal to the output voltage of the DC/DC convertor 5 and the input voltage of the DC/AC invertor 6.

When the adjustment in step S20 is completed, the DC/AC invertor 6 determines whether or not the connection point voltage V link is equal to or less than (420−α) V (where a is an arbitrary value but preferably falls within a range from zero to a few volts).

Figure 7:
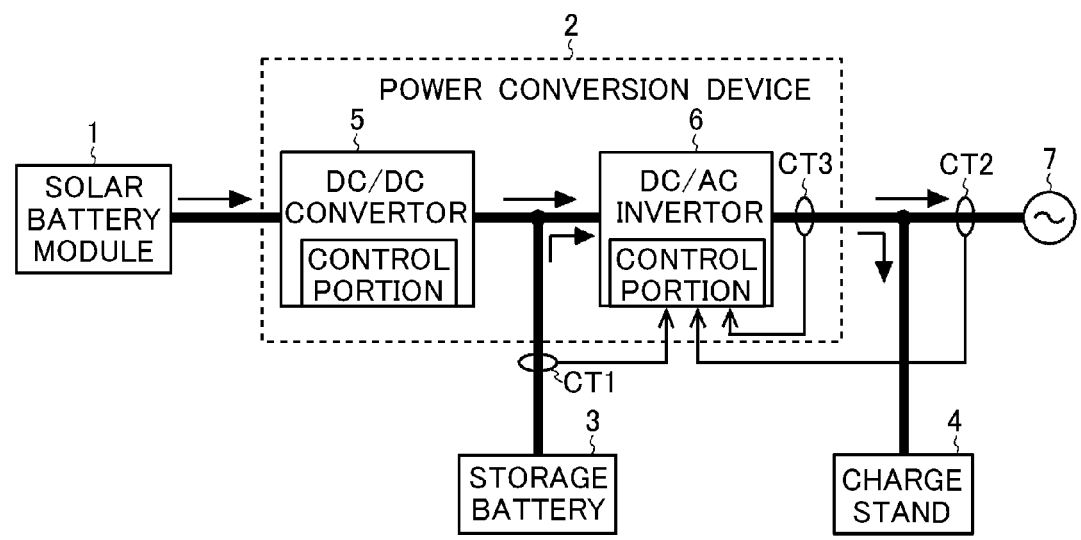
[FIG. 7] A diagram showing a state of power supply when the storage battery is fully charged while the charge stand is being used.

If the connection point voltage V link is higher than (420−α) V (no in step S30), the storage battery 3 is fully charged. Hence, in order to perform reverse power flow to the commercial system 7, the DC/AC invertor 6 makes the amplitude value of the output current higher than the adjustment value in step S20 and thereby performs overcharge protection, and thereafter the process returns to step S10. Consequently, the state of the power supply is as shown in FIG. 7. On the other hand, if the connection point voltage V link is equal to or less than (420−α) V (yes in step S30), the DC/AC invertor 6 determines whether or not the connection point voltage V link is equal to or less than (330+β) V (where β is an arbitrary value but preferably falls within a range from zero to a few volts).

Figure 8:
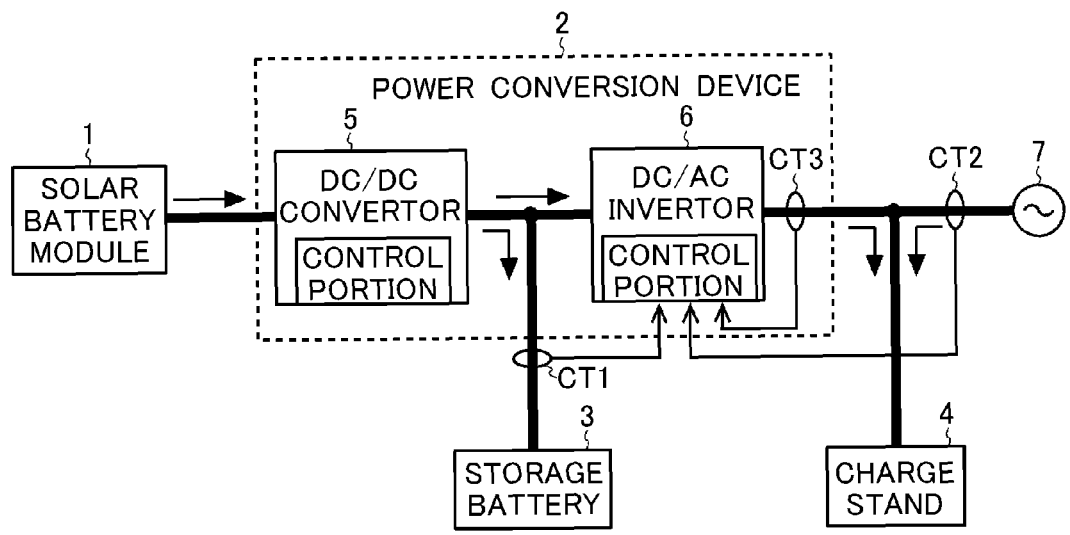
[FIG. 8] A diagram showing a state of power supply when the storage battery is fully charged while the charge stand is being used.

If the connection point voltage V link is lower than (330+β) V (no in step S40), the storage battery 3 is fully charged. Hence, in order to preferentially supply the power generated by the solar battery module 1 to the storage battery 3, the DC/AC invertor 6 makes the amplitude value of the output current lower than the adjustment value in step S20 and thereby performs overdischarge protection, and thereafter the process returns to step S10. Although the amplitude value of the output current is readjusted, and thus the output power from the DC/AC invertor 6 is reduced, the shortage resulting from the reduction is compensated for by the commercial system 7 and power equivalent to the shortage is supplied to the charge stand 4. Consequently, the state of the power supply is as shown in FIG. 8. On other hand, if the connection point voltage V link is equal to or more than (330+β) V (yes in step S40), the process returns to step S10 immediately.

If, as a result of the determination in step S10, the charge stand 4 is not being used (no in step S10), the DC/AC invertor 6 determines whether or not the connection point voltage V link is equal to or less than (420−α) V (step S70).

Figure 9:
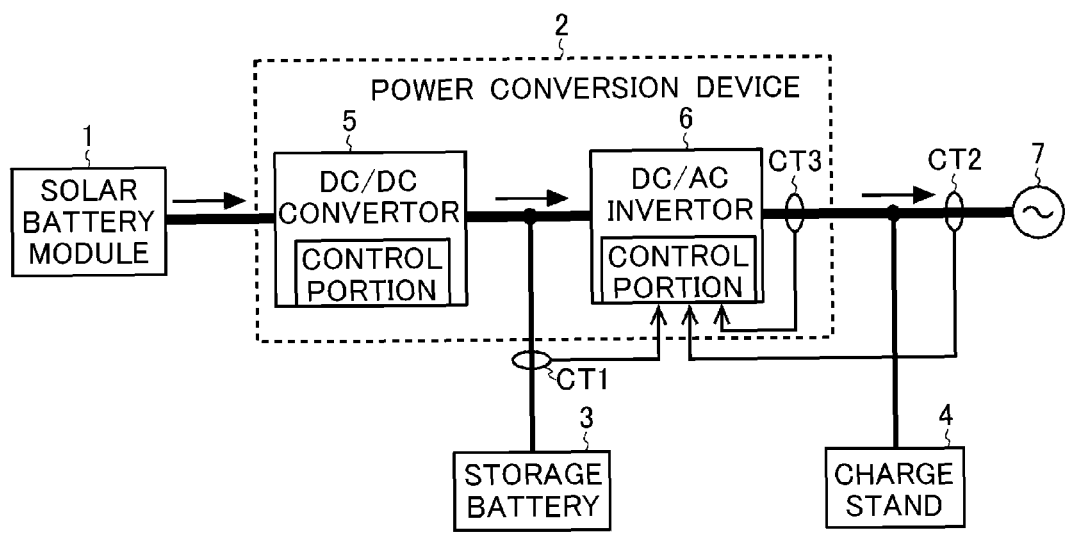
[FIG. 9] A diagram showing a state of power supply when the storage battery is fully charged while the charge stand is not being used.
Figure 10:
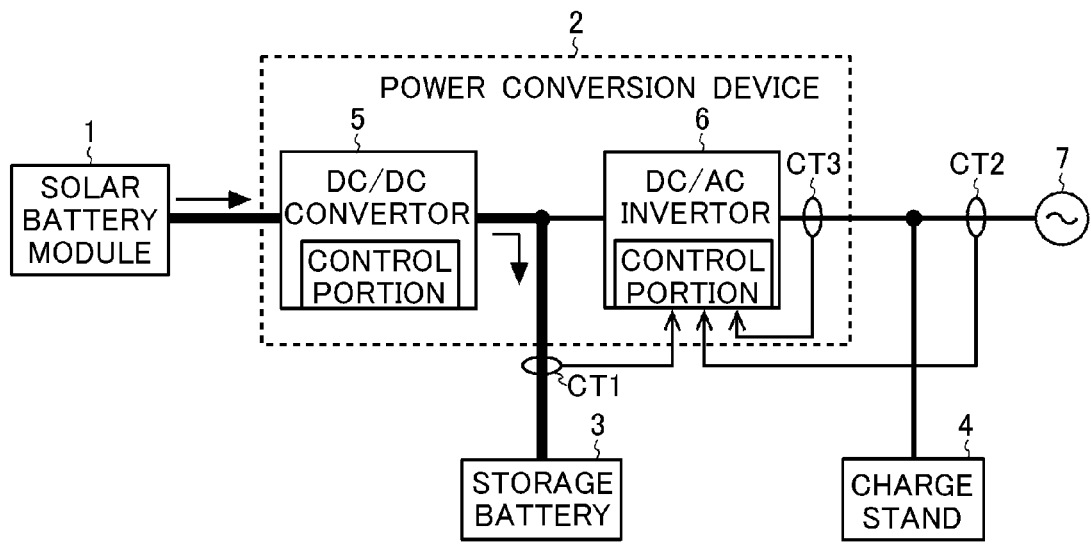
[FIG. 10] A diagram showing a state of power supply when the storage battery is not fully charged while the charge stand is not being used.

If the connection point voltage V link is higher than (420−α) V (no in step S70), the amplitude value of the output current is adjusted such that all the power generated by the solar battery module 1 is supplied to the commercial system 7, and thereafter the process returns to step S10. Consequently, the state of the power supply is as shown in FIG. 9. On other hand, if the connection point voltage V link is equal to or less than (420−α) V (yes in step S70), the DC/AC invertor 6 adjusts the amplitude value of the output current so as to supply all the power generated by the solar battery module 1 to the storage battery 3 or stops the output to disconnect from the commercial system 7, and thereafter the process returns to step S10. Consequently, the state of the power supply is as shown in FIG. 10.

In addition to the operation described above, overcurrent protection for the charge and discharge current of the storage battery 3 is preferably performed. For example, preferably, if the charge current of the storage battery 3 becomes an overcurrent, the DC/AC invertor 6 increases the amplitude value of the output current, and thus the charge current of the storage battery 3 is reduced whereas, if the discharge current of the storage battery 3 becomes an overcurrent, the DC/AC invertor 6 decreases the amplitude value of the output current, and thus the discharge current of the storage battery 3 is reduced.

As obvious from the operation described above, in the solar power generation system shown in FIG. 1, if the charge stand 4 is not being used, the power generated by the solar battery module 1 is stored in the storage battery 3, and then the reverse power flow to the commercial system 7 is performed when the storage battery 3 is fully charged whereas, if the charge stand 4 is being used, the power generated by the solar battery module 1 is preferentially used, and, if the consumption power of the charge stand 4 is not covered only by the power generated by the solar battery module 1, the power stored in the storage battery 3 is used or if the consumption power of the charge stand 4 is not covered only by the power generated by the solar battery module 1 and the power stored in the storage battery 3, the power of the commercial system 7 is used. In the solar power generation system shown in FIG. 1, only when the consumption power of the charge stand 4 is not covered only by the power generated by the system itself due to long-term bad weather, the power is received from the commercial system 7 whereas, only when not all the power generated by the system itself can be stored in the storage battery 3, the reverse power flow to the commercial system 7 is performed.

Here, when a load such as the charge stand 4 is used, and it is not desired to reduce power supply to the load below a predetermined value, even if the consumption power of the load is covered only by the power generated by the solar battery module 1, the power stored in the storage battery 3 may be used, for example, when the power generated by the solar battery module 1 drops below a certain threshold value. Likewise, even if the consumption power of the load is covered only by the power generated by the solar battery module 1 and the power stored in the storage battery 3, the power of the commercial system 7 may be used, for example, when the power generated by the solar battery module 1 and the power stored in the storage battery 3 drop below a certain threshold value.

As obvious from the operation described above, in the solar power generation system shown in FIG. 1, the power from the commercial system 7 is not stored in the storage battery 3, and the power generated by the solar battery module 1 is stored in the storage battery 3. In this way, even in the purchasing system of a power company where power provided by the commercial system is not purchased, the problem does not occur that results from the fact that it is impossible to distinguish whether the power stored in the storage battery 3 is supplied by the power generation of the solar battery module 1 or by the commercial system 7.

Although the embodiment of the present invention has been described above, the range of the present invention is not limited to this embodiment. Various modifications are possible without departing from the spirit of the present invention. Some examples of the modifications will be described below.

Figure 11:
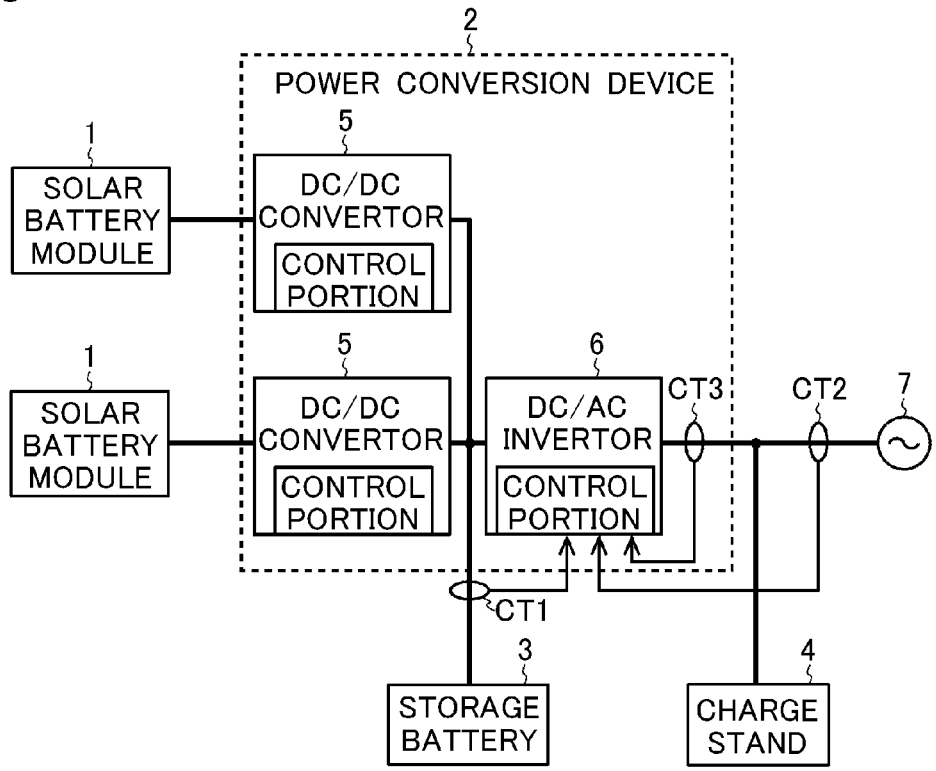
[FIG. 11] A diagram showing a variation of the solar power generation system according to the present invention.

As shown in FIG. 11, a plurality of solar battery modules 1 may be provided, and as many DC/DC convertors 5 of the power conversion device as the solar battery modules 1 may be provided. Preferably, in this case, the DC/DC convertors 5 perform the MPPT control individually.

In the solar power generation system shown in FIG. 1 and according to the present invention, when the storage battery 3 is fully charged, the power supply to the charge stand 4 is performed only by the solar battery module 1 and the commercial system 7 or only by the commercial system 7, and, when power is output from the solar battery module, the output power is stored in the storage battery 3. For example, when three solar power generation systems shown in FIG. 1 and according to the present invention are individually provided, the three solar battery modules 1 respectively correspond to the three storage batteries 3 on an individual system basis, and power is supplied only from one solar battery module 1 to the storage battery 3 of full discharge.

Figure 12:
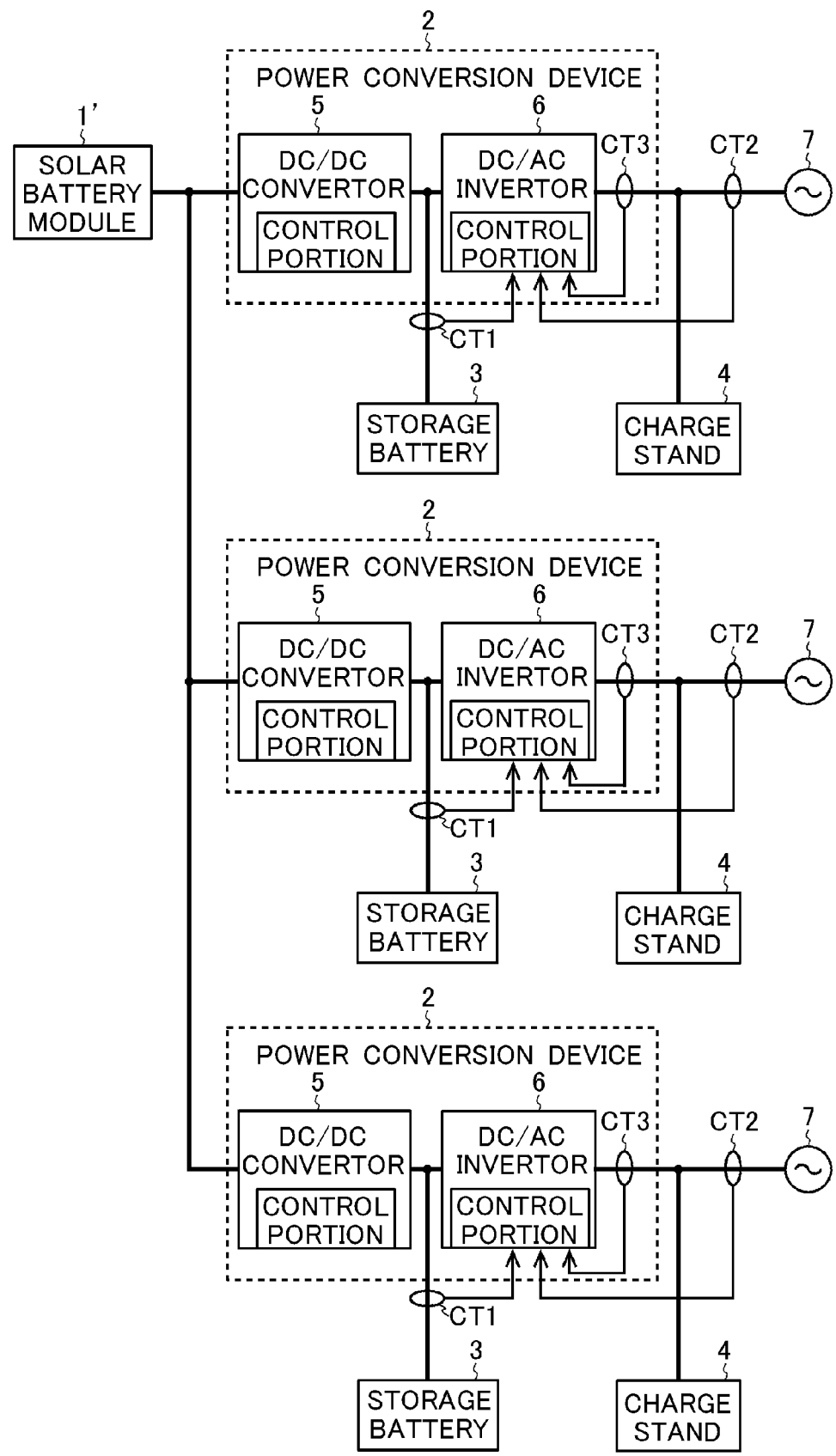
[FIG. 12] A diagram showing another variation of the solar power generation system according to the present invention.

Hence, for example, as shown in FIG. 12, a solar battery module 1' that is equivalent to three solar battery modules 1 is connected to three power conversion devices 2, with the result that power may be supplied from the solar battery module 1' (=three solar battery modules 1) to one storage battery 3 of full discharge. In this way, the function of charging the storage battery that the solar battery module has is enhanced.

In the solar power generation system shown in FIG. 1 and according to the present invention, the charge stand 4 is connected to the output end of the DC/AC invertor 6, and the charge stand 4 inputs AC power; when the charge stand 4 is a rapid charge stand, it is necessary to provide a high-voltage power conversion facility, between the commercial system 7 and the current sensor CT2, that receives high-voltage power from the commercial system 7 and converts the high-voltage power into low-voltage power.

Figure 13:
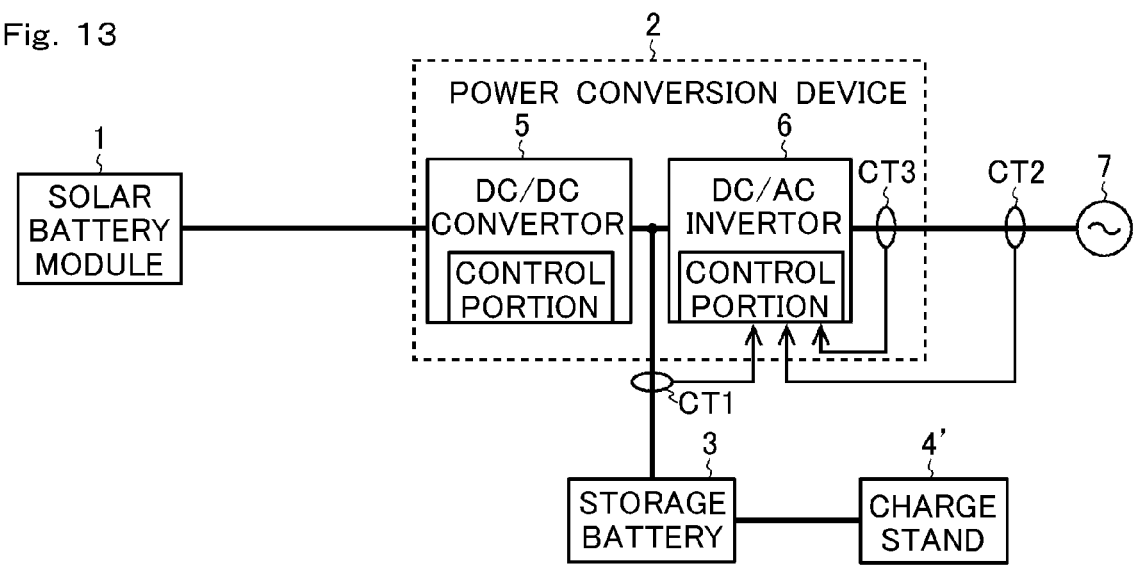
[FIG. 13] A diagram showing yet another variation of the solar power generation system according to the present invention.

By contrast, for example, as shown in FIG. 13, a charge stand 4' is connected to the storage battery 3, and the charge stand 4' inputs DC power. In this way, the charge ability of the charge stand 4' is determined by the capacity of the storage battery 3, and thus it is possible to realize the rapid charge stand without any provision of the high-voltage power conversion facility.

In the solar power generation system shown in FIG. 13 and according to the present invention, the output power of the DC/AC invertor 6 is controlled such that the power conversion device 2 preferentially charges the storage battery 3 with the power generated by the solar battery module 1 and that reverse power flow to the commercial system 7 is performed on surplus power. The method of recognizing the state of charge of the storage battery 3 is the same as in the case of the solar power generation system shown in FIG. 1 and according to the present invention.

Figure 14:
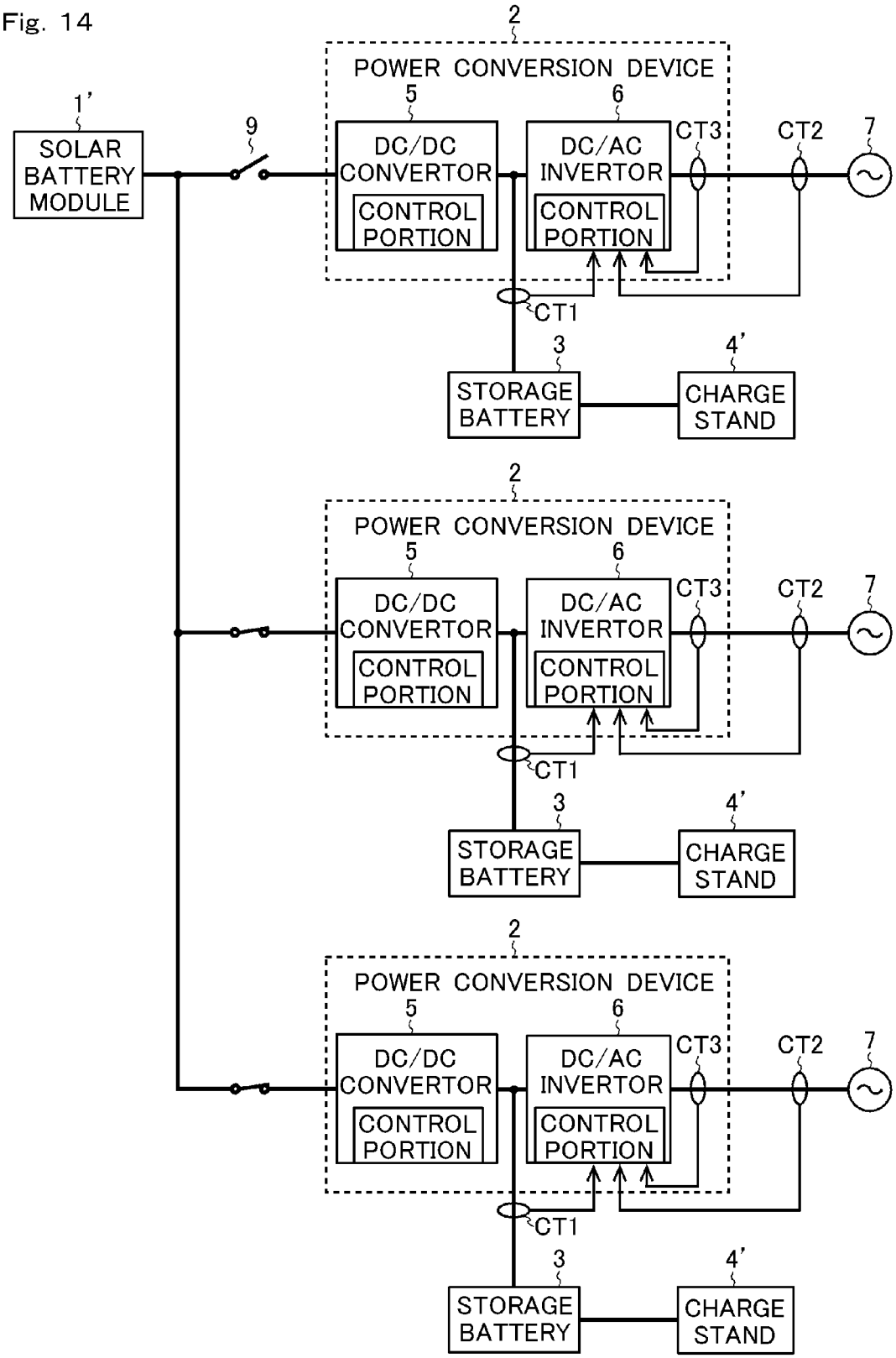
[FIG. 14] A diagram showing still another variation of the solar power generation system according to the present invention.

The same modification as that from the solar power generation system shown in FIG. 1 and according to the present invention to the solar power generation system shown in FIG. 12 and according to the present invention is performed on the solar power generation system shown in FIG. 13 and according to the present invention, with the result that the solar power generation system may be configured as shown in FIG. 14. In the solar power generation system shown in FIG. 14 and according to the present invention, as in the solar power generation system shown in FIG. 13 and according to the present invention, the rapid charge stand can be realized without any provision of the high-voltage power conversion facility, and, as in the solar power generation system shown in FIG. 12 and according to the present invention, the ability to charge the storage battery that the solar battery module has is enhanced. Preferably, in the solar power generation system shown in FIG. 14 and according to the present invention, for example, when the corresponding storage battery 3 is changed from a state other than the state of full discharge to the state of full discharge, a switch 9 is automatically switched from an open state to a closed state whereas, when the corresponding storage battery 3 is changed from a state other than the state of full charge to the state of full charge, the switch 9 is automatically switched from a closed state to an open state.

The storage battery 3 may be a stationary type that is not intended to be replaced by a user; the storage battery 3 may be a removable type that is intended to be replaced by the user.

When the storage battery 3 is connected to the DC/DC convertor 5 and the DC/AC invertor 6, the connection may be performed through a protection circuit, a fuse or the like.

For example, when a lead-acid battery is used as the storage battery 3, uniform charge may be performed. In the uniform charge, even after the voltage of the storage battery reaches the upper limit value in the specifications, the charge is continued such that the voltage of the storage battery remains the upper limit value for a given period of time. In this way, the state of charge of the storage battery 3 consisting of a plurality of cells is made uniform, and thus it is possible to reduce life degradation.

A function of preventing the reverse power flow to the commercial system 7 may be provided. The prevention of the reverse power flow to the commercial system 7 can be probably achieved by the following methods: for example, the DC/AC invertor 6 of the power conversion device 2 has a watch function, and thus the reverse power flow to the commercial system 7 is prevented for a specific period of time; the DC/AC invertor 6 of the power conversion device 2 has a power line communication function, and the reverse power flow to the commercial system 7 is prevented when a notification of the prevention of the reverse power flow to the commercial system 7 is received from a power company by power line communication. Since the detection signal of the current sensor CT3 allows the determination of whether or not the reverse power flow to the commercial system 7 is performed, in order for the reverse power flow to the commercial system 7 to be prevented, when the reverse power flow to the commercial system 7 is determined by the detection signal of the current sensor CT3, the DC/AC invertor 6 of the power conversion device 2 preferably reduces the amplitude value of the output current.

In the power generation system of the present invention, a direct-current power supply (for example, a wind power generation device or a geothermal power generation device) other than the solar battery may be used. In the power generation system of the present invention, the DC/DC convertor of the power conversion device may control the output power of the direct-current power supply through control other than the MPPT control. In the power generation system of the present invention, a load (for example, a household appliance) other than the charge stand may be used. In the power generation system of the present invention, a storage device (for example, an electric double layer capacitor) other than the storage battery may be used.

Industrial Applicability

According to the present invention, it is possible to effectively utilize power generated by a direct-current power supply (for example, a solar battery).

LIST OF REFERENCE SYMBOLS 1, 1' solar battery module
2 power conversion device
3 storage battery
4, 4' charge stand
5 DC/DC convertor
6 DC/AC invertor
7 commercial system
8 roof of a carport
9 switch
CT1 to CT3 current sensor

The invention claimed is:
1. A power conversion device comprising:
a DC/DC convertor that performs DC/DC conversion on an output voltage of a direct-current power supply; and
a DC/AC invertor that performs DC/AC conversion on an output voltage of the DC/DC convertor,
wherein:
an output power of the DC/AC invertor is controlled such that charge and discharge of storage device con- nected to a connection point between an output end of the DC/DC convertor and an input end of the DC/AC invertor are controlled, an output end of the DC/AC invertor is connected to a load and a commercial system, wherein, when a power discharged from the storage device exceeds an upper limit of an allowable range, the output power of the DC/AC invertor is reduced, and, even if the load is being used, the power of the commercial system is preferentially used in the load as compared with the power generated by the direct-current power supply; and wherein the load is a charge stand that charges a charge target and the direct-current power supply is lower than consumption power of the charge stand, when the control is performed such that the amplitude of the output current of the DC/AC inventor is increased, the direct-current power supply becomes insufficient, and the output voltage of the DC/DC converter becomes lower than the voltage before the amplitude of the output current of the DC/AC invertor was controlled.

2. A power generation system comprising:
the power conversion device of claim 1;
the direct-current power supply that is connected to the DC/DC convertor of the power conversion device;
the storage device that is connected to the connection point between the output end of the DC/DC convertor and the input end of the DC/AC invertor of the power conversion device; and
the load that is connected to the output end of the DC/AC invertor,
wherein the output end of the DC/AC invertor is connected to the commercial system.

3. A power generation system comprising:
the power conversion device of claim 1;
the direct-current power supply that is connected to the DC/DC convertor of the power conversion device;
the storage device that is connected to the connection point between the output end of the DC/DC convertor and the input end of the DC/AC invertor of the power conversion device; and
the load that inputs a direct-current power output from the storage device,
wherein the output end of the DC/AC invertor is connected to the commercial system.

4. A power generation system comprising:
a power conversion device which includes:
a DC/DC convertor that performs DC/DC conversion on an output voltage of a direct-current power supply; and
a DC/AC invertor that performs DC/AC conversion on an output voltage of the DC/DC convertor, and in which an output power of the DC/AC inverter is controlled such that charge and discharge of a storage device connected to a connection point between an output end of the DC/DC convertor and an input end of the DC/AC invertor are controlled;

the direct-current power supply that is connected to the DC/DC convertor of the power conversion device;
the storage device that is connected to the connection point between the output end of the DC/DC convertor and the input end of the DC/AC invertor of the power conversion device; and
a load that is connected to the output end of the DC/AC invertor or that inputs a direct-current power output from the storage device,
wherein:
the output end of the DC/AC invertor is connected to the commercial system, when the direct-power generated by the solar battery is higher than the consumption power of the charge stand, the DC/AC invertor adjusts the amplitude value of the output current such that the output power of the DC/AC invertor is equal to the consumption power of the charge stand
the direct-current power supply is a solar battery,
the load is a charge stand that charges a charge target and
the DC/DC convertor controls an operation point of the solar battery by maximum power point follow control.

5. A power generation system comprising:
the power conversion device of claim 4;
the direct-current power supply that is connected to the DC/DC convertor of the power conversion device;
the storage device that is connected to the connection point between the output end of the DC/DC convertor and the input end of the DC/AC invertor of the power conversion device; and
the load that is connected to the output end of the DC/AC invertor,
wherein the output end of the DC/AC invertor is connected to the commercial system.

6. A power generation system comprising:
the power conversion device of claim 4;
the direct-current power supply that is connected to the DC/DC convertor of the power conversion device;
the storage device that is connected to the connection point between the output end of the DC/DC convertor and the input end of the DC/AC invertor of the power conversion device; and
the load that inputs a direct-current power output from the storage device,
wherein the output end of the DC/AC invertor is connected to the commercial system.

* * * * *